Jan. 29, 1935. J. A. DE VITO Re. 19,443

HYDRAULIC DIAPHRAGM BRAKE

Original Filed Aug. 17, 1926 2 Sheets-Sheet 1

INVENTOR.
John A. De Vito
BY Jerome R. Cox.
ATTORNEY.

Jan. 29, 1935. J. A. DE VITO Re. 19,443
HYDRAULIC DIAPHRAGM BRAKE
Original Filed Aug. 17, 1926 2 Sheets-Sheet 2
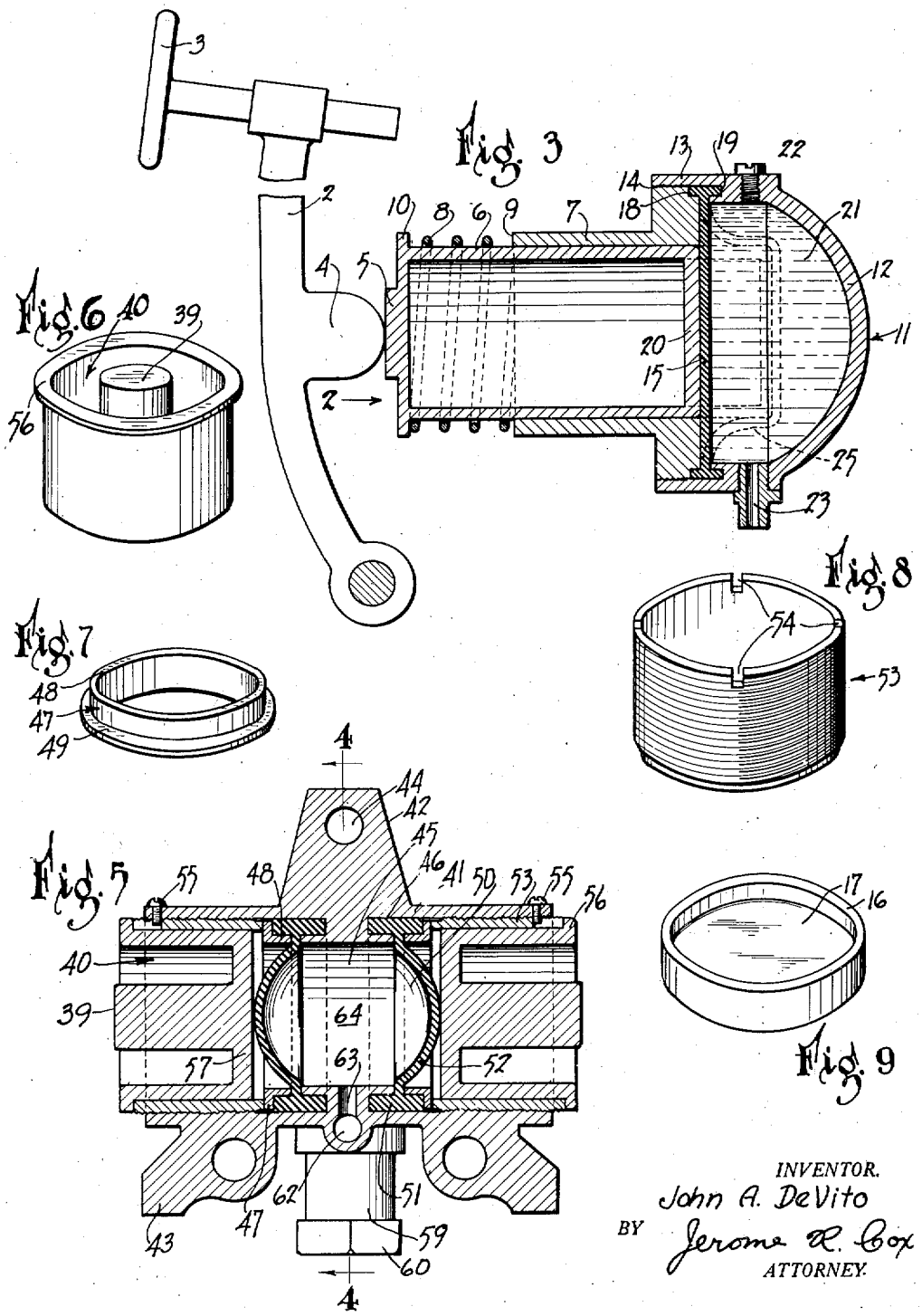
INVENTOR.
John A. DeVito
BY Jerome R. Cox
ATTORNEY.

Reissued Jan. 29, 1935 Re. 19,443

UNITED STATES PATENT OFFICE 19,443

HYDRAULIC DIAPHRAGM BRAKE

John A. De Vito, Hawthorne, Calif., assignor to Bendix Brake Company, South Bend, Ind., a corporation of Illinois Original No. 1,791,717, dated February 10, 1931, Serial No. 129,691, August 17, 1926. Application for reissue January 28, 1933, Serial No. 654,080

5 Claims. (Cl. 60—54.6)

My invention is a hydraulic diaphragm brake or other hydraulic structure in which a diaphragm is utilized in the transmission of hydraulic power or force.

One of the difficulties of hydraulic mechanism such as brakes is in the leakage of the compression fluid around the pistons or piston packing bore in the compressor or pump and in the device for applying the pressure through moving pistons. In the application of hydraulic brakes the movement of a piston in the compressor is comparatively small, and the movement of the pistons in the brake mechanism for applying this power to the brakes is also small, but nevertheless there is sufficient leakage to be inconvenient and to require replenishing.

My invention applies both to compressors or pumps and also to the means for utilizing a compressed fluid in which the movement is comparatively small and hence I use a resilient flexible diaphragm which may give under pressure and thus prevent direct engagement of the fluid with the pistons both in the compressors or pumps and in the cylinders utilizing pistons to deliver power.

An object of my invention therefore is in the construction of compressors or pumps having a restricted motion and in power delivery or transmitting devices having cylinders with pistons to utilize resilient diaphragms such as rubber diaphragms through which the pressure is transmitted to or from the hydraulic fluid on one side of the diaphragm, the piston being on the other side of the diaphragm.

A specific use of my invention is its application to hydraulic brakes as applied to automobiles in which I utilize the diaphragm in the compressor or pump and also in the cylinders for applying the power to the brake mechanism.

In constructing my invention, I provide compressors or pumps and the usual housing with a rubber diaphragm positioned therein on one side of the hydraulic chamber, a piston fitting against the other side of the diaphragm and being slidable in a cylinder, the piston being actuated usually by some type of lever actuated by a foot or brake pedal. The pressing of the piston inwardly stretches the diaphragm and compresses the liquid in the liquid chamber. A spring is utilized to return the piston to its normal position.

In the power applying mechanism I utilize one or more resilient or rubber diaphragms secured in a cylinder in an expansion chamber and have a piping connection from the compressor to such chamber. One or more pistons are positioned in the cylinder on the outside of the diaphragms and when fluid is forced into the expansion chamber the diaphragms are stretched, pressing against the pistons and forcing the same outwardly, thus transmitting pressure.

My invention so far as its general and specific applications are concerned, will be more readily understood from the following description and drawings, in which:

Figure 3 is a longitudinal section of the compressor taken on the line 3—3 of Figure 2;

Figure 5 is a longitudinal section of the power applying mechanism, being taken on the line 5—5 of Figure 4;

Figure 6 is a perspective view of one of the pistons of the power applying mechanism;

Figure 7 is a perspective view of an angular ring for holding the diaphragm in position;

Figure 8 is a perspective view of a clamping sleeve for clamping the angular ring and diaphragm in proper position in the cylinder;

Figure 9 is a perspective view of one of the resilient diaphragms when dismounted in an unrestrained position;

Figure 1:
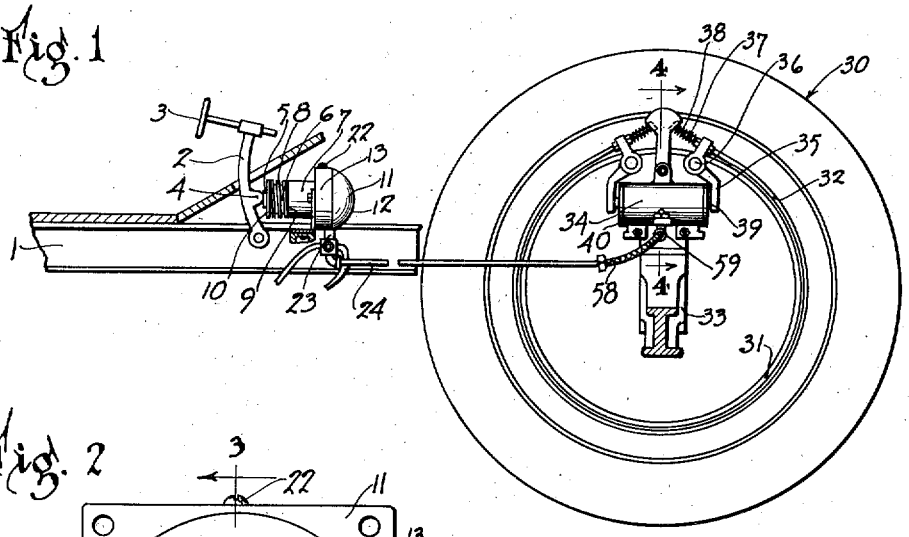
Figure 1 is a longitudinal section through part of a motor vehicle indicating the manner of mounting the compressor and the application of the hydraulic power to external type brakes.

The compressor is constructed substantially as follows, having reference particularly to Figures 1, 2 and 3:

The frame of the vehicle is designated by the numeral 1 on which is mounted a brake lever or pedal 2 having a foot rest 3. This pedal has a nub 4 bearing against the outer end 5 of a piston 6. This piston is mounted in a cylinder 7 and has a coiled spring 8 normally bearing against the outer end 9 of the cylinder and against a flange 10 of the piston head.

A pump or compressor casing 11 having a domed side 12 and flanges 13 is connected to the cylinder by screw threads or the like 14 and clamps a diaphragm designated generally by the numeral 15. This diaphragm has a rim 16 and an imperforate web 17, the rim extending preferably on both sides of the diaphragm. It is preferable to have a recess 18 formed in the outer periphery of the cylinder and an annular groove 19 formed in the flange 13 to receive the rim of the diaphragm. The base 20 of the piston bears directly against the diaphragm. The casing 11 forms fluid chamber 21 and is provided with a filling opening which is normally closed by a plug 22 and the outlet 23 is connected to suitable piping such as 24 leading to the power applying mechanism.

The manner of working of my pump or compressor above described is substantially as follows:

When the foot pedal or any other suitable device is operated so as to press on the piston head 5, the base of the piston is forced against the diaphragm and in particular against the web 17 and distorts or stretches the web somewhat as illustrated by the dotted lines 25 of Figure 3, thereby compressing the liquid in the liquid chamber 21 and forcing it through the various pipes to the power applying mechanism.

In an automobile there would preferably be either two pipes for rear brakes or four pipes for both front and rear brakes. When the foot pedal is released the spring 8 forces the piston outwardly and allows the diaphragm to be returned to its normal position. The fluid is forced backwardly into the fluid chamber by the power applying devices as hereunder set forth or in any suitable manner.

Figure 2:
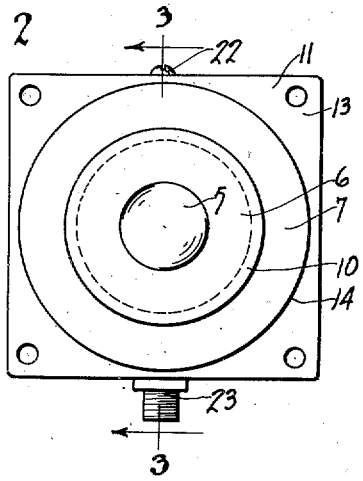
Figure 2 is a rear view of the compressor as if taken in the direction of the arrow 2 of Figure 3.
Figure 4:
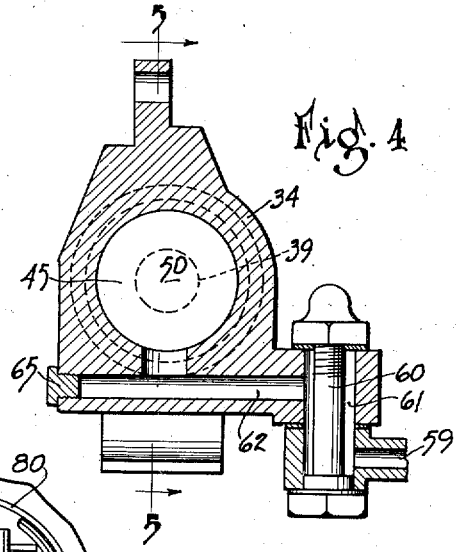
Figure 4 is a section of the power applying mechanism, being taken on the line 4—4 of Figure 5.

The power applying devices as applied to a double cylinder construction are substantially as follows, having references particularly to Figures 1, 4, 5, 6, 7, 8 and 9:

In Figure 1 a wheel is designated generally by the numeral 30 shown as having a brake drum 31 with a contracting brake band 32 extending partly thereabout. An axle structure is designated by the numeral 33 or there may be provided any other suitable device to support the cylinder 34, the cylinder 34 in external configuration complying to standard construction so that my invention may be applied to standard cars.

The brake band is operated by fingers 35 mounted on fixed pintles 36 having slidable engagements with the stem ends 37 of the brake band, there being springs 38 to free the band from the drum after the power has been released. These fingers press against the heads 39 of the pistons designated generally by the numeral 40.

The cylinder 34 is formed as follows:

A double ended cylinder 41 is provided with barckets 42 and 43 with apertures 44 therethrough to allow attachment to a suitable supporting structure, this being a standard and known construction. The cylinder is formed with a central chamber 45 and has annular grooves or recesses 46. Angle rings 47 having a cylindrical flange 48 and a radial flange 49 are fitted into the cylinders and engage the diaphragms 50. These diaphragms have a rim section 51 and an imperforate web section 52, these being similar to the rim and web portions 16 and 17 shown in Figure 9.

Clamping sleeves 53 shown particularly in Figure 8 are threaded into the cylinder 41 bearing against the radial flanges 49 of the rings 47. These sleeves have notches 54 to allow insertion of set screws 55 extending through the cylinder to retain such sleeves from rotation. The pistons 40 fit inside the sleeves 53 and have sliding motion therein being restrained by the rims 56 in the inward motion and the bases 57 of the pistons practically touching the webs of the diaphragms. These diaphragms when compressed assume an arched shape as shown in Figure 5.

The inlet to the power applying mechanism from the pipes 24 is through a coupling pipe 58 leading to a tubular coupling 59 secured by a bolt 60 to the inlet 61 of the cylinder. The fluid passes through the transverse passage 62 and through the passage 63 into the expansion chamber 64 which corresponds substantially to the chamber 45. There is preferably a plug 65 to close the passage 62 at the end opposite the inlet.

The manner of operation of the power applying mechanism above described is substantially as follows:

When the fluid has been compressed in any suitable manner and forced through the pipes 24 into the expansion chamber 64 the diaphragms are stretched so that the webs 47 of the diaphragms press tightly against the base of the pistons, forcing such pistons outwardly or apart as shown in Figure 5, the pistons as above mentioned pressing on the fingers 35, thus applying the brake band by applying a tension thereto and drawing it tight around the drum. When the compressor or pump is released the fingers, due to the spring action pressing on the pistons force the same inwardly and force the fluid from the compression chamber 64 back to the fluid chamber 21 of the compressor.

Figure 10:
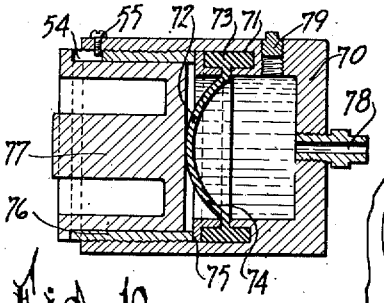
Figure 10 illustrates a modification of the power applying mechanism, having only one piston, being a longitudinal section.

In the construction shown in Figure 10 the power applying device has only one diaphragm, there being a cylinder 70 having an annular groove 71 therein, a diaphragm 72 having a rim 73 held therein, the imperforate web 74 stretching across the cylinder. An angle ring 75 similar to the construction shown in Figure 7 is held in place against the rim of the diaphragm by a clamping sleeve 76 of a similar construction to that shown in Figure 8, this sleeve being threaded in the cylinder and held from rotation therein. A piston 77 of a construction similar to that shown in Figure 6 has a sliding motion in the sleeve and is pressed against by a diaphragm. The inlet 78 receives the fluid under compression from any suitable source and there is also provided a plug 79 to allow refilling if necessary.

Figure 11:
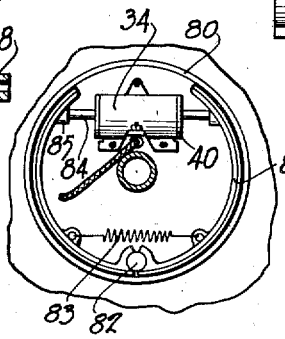
Figure 11 is an elevational detail of the application of the power applying mechanism to internal expanding brakes.

My invention may readily be applied to internal expanding brakes as shown in Figure 11 in which a brake drum is indicated by the numeral 80 and the brake bands 81 being pivotally connected together by a pivot pin 82, this being supported in a suitable manner and having a spring 83 to draw same together. A cylinder 34 may be mounted in a manner somewhat similar to that shown in Figure 1. In this construction it is desirable to provide the pistons with extensions 84 which bear against lugs 85 on the inside of the brake bands. Therefore when the liquid in the expansion chamber of the cylinder forces the pistons outwardly, the brake bands are thrust apart, thereby applying the braking power to the wheels. After the compressor is released the spring 83 releases the bands from the drums, aiding the forcing of the liquid from the power applying device back to the compressor. This action is also aided by the spring 8 forcing the piston 6 outwardly and thereby creating a vacuum.

Although my hydraulic appliances have been illustrated in connection with hydraulic brakes for automobiles or the like, it will be manifest that the device or construction utilizing a diaphragm to transmit pressure may be utilized in many other applications and provide an absolutely leak-proof mechanism so far as the compressors are concerned, in which the action is of a limited stroke and to power applying mechanism which also have a comparatively limited stroke, such stroke being insufficient to expand or stretch the diaphragm beyond its power to return.

A characteristic feature of my invention, both as applied to the compressor and to the brake actuating cylinders, is that the diaphragm has an integral web and rim, the web being imperforate and of material having the same characteristics throughout. The whole of the diaphragm is of resilient material and the web is flexible, therefore it may stretch and retract into its original position and condition. Therefore, when the piston in the compressor is forced inwardly, it stretches the web, thereby compresing the fluid in the compressor without any chance of leakage adjacent the rim or the piston. Also, in the brake actuating cylinders, the compressed fluid acts on the web of the diaphragm and stretches this so that the fluid exerts a pressure through the stretched diaphragm on the pistons and forces these outwardly. This web in the brake cylinders also retracts due to its resiliency.

Another characteristic of my invention is that the rim portion is of much greater cross-sectional area than the adjacent portions of the web. While this rim is illustrated as of a cylindrical formation, it is obvious that the shape may be changed without departing from my invention. This construction of the rim enables such rim to be clamped in the structure forming the compressor and in the structure forming the brake operating cylinders in such a manner as to make a leak-proof joint, which is especially so on account of the resiliency and elasticity of the rim.

Another characteristic of my invention is that in the compressor or pulse-producing device a single piston is utilized, such piston causing the compression of the fluid acting through the web of the diaphragm. This compressed fluid is conveyed to a fluid chamber of considerable volume in the brake-actuating or pulse-receiving device which has the flexible web of the diaphragm on one side of such chamber. Therefore, immediately the fluid is compressed in the compressor or pulse-producing device the action is communicated to the brake-operating or pulse-receiving device on account of the large volume of fluid held therein.

It is obvious therefore that my invention may be considerably modified in general construction or in specific details to adapt same to different installations. Such changes would be within the spirit of my invention as set forth in the description, drawings, and claims.

Having described my invention, what I claim is:

1. In a device as described a structure having a fluid chamber, a rubber diaphragm having an entirely closed, flexible, stretchable, and retractable web, and a continuous, integral, somewhat cylindrical rim, means to secure one portion of the rim to the said structure, an angular ring having a radial flange engaging one edge of the rim and having a cylindrical flange engaging another portion of the rim, and means to clamp the ring against the said rim, the web forming a closure for one side of the chamber, and a cylinder having a slidable piston positioned to bear against the web on the side opposite the chamber.

2. In a device as described the combination of a structure having a fluid chamber and an annular groove in said structure adjacent said chamber, a rubber diaphragm having a continuous, cylindrical rim, and an integral imperforate web connected to the rim, one portion of the rim fitting in the said groove and the web forming a closure for one side of the chamber, an angular ring having a radial flange engaging one end of the cylindrical rim and having a cylindrical flange engaging a cylindrical portion of the rim, means to clamp the ring against the said rim to form a fluid-tight seal, and a cylinder structure having a piston bearing on the side of the web opposite the chamber.

3. In a device as described a structure having a fluid chamber with an annular groove adjacent one side of the chamber, a rubber diaphragm having a continuous, cylindrical rim with one portion fitting in the said groove and having an integral, imperforate web, an angular ring having a radial flange engaging one portion of the rim and having a cylindrical flange engaging another portion of the rim, a sleeve to press the ring in contact with the rim, and a piston slidable in the sleeve to engage the web on the side opposite the chamber.

4. In a device as described, the combination of a structure having a fluid chamber and an annular groove in said structure adjacent said chamber, a rubber diaphragm having a continuous, cylindrical rim, and an integral imperforate web connected to the rim, one portion of the rim fitting in said groove and the web forming a closure for one side of the chamber, an annular cylindrical member having a radially directed flange engaging one end of the cylindrical rim and having an axially directed flange engaging a cylindrical portion of the rim, threaded means to clamp the cylindrical member against the said rim to form a fluid-tight seal, and a piston bearing on the side of the web opposite the chamber.

5. In a device as described, the combination of a cylinder having a fluid chamber and an annular groove in said cylinder adjacent said chamber, a flexible diaphragm having a continuous, cylindrical rim, and an integral imperforate web connected to the rim, one portion of the rim fitting in said groove and the web forming a closure for one side of the chamber, means for sealing said rim to said cylinder including a cylindrical member having a pair of angularly related surfaces, one extending in a generally radial direction and engaging one end of the cylindrical rim, the other extending in an axial direction and engaging a cylindrical portion of the rim, and said means further comprising a sleeve back of said member and threaded into the cylinder and internally formed as a bearing for a piston engaging said web on the side opposite the chamber.

JOHN A. DE VITO.